(No Model.)

J. W. CAMPBELL.
HAT AND COAT HOOK.

No. 419,414. Patented Jan. 14, 1890.

Witnesses:—
D. H. Haywood
George Barry.

Inventor:—
James W. Campbell
by his attorneys.
Brown & Griswold

UNITED STATES PATENT OFFICE.

JAMES W. CAMPBELL, OF GERMANTOWN, ASSIGNOR TO FERGUSON BROTHERS, OF NEW YORK, N. Y.

HAT AND COAT HOOK.

SPECIFICATION forming part of Letters Patent No. 419,414, dated January 14, 1890.

Application filed November 14, 1889. Serial No. 330,251. (No model.)

*To all whom it may concern:*

Be it known that I, JAMES W. CAMPBELL, of Germantown, in the county of Columbia and State of New York, have invented a certain new and useful Improvement in Hat and Coat Hooks, of which the following is a specification.

I will describe in detail a hook embodying my improvement and then point out the novel features in a claim.

Figure 1:
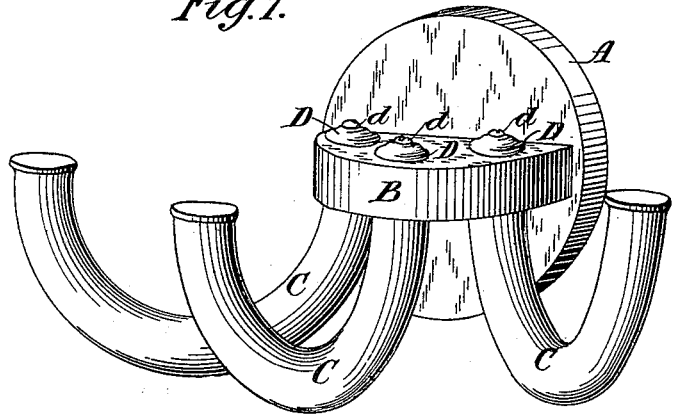
Figure 2:
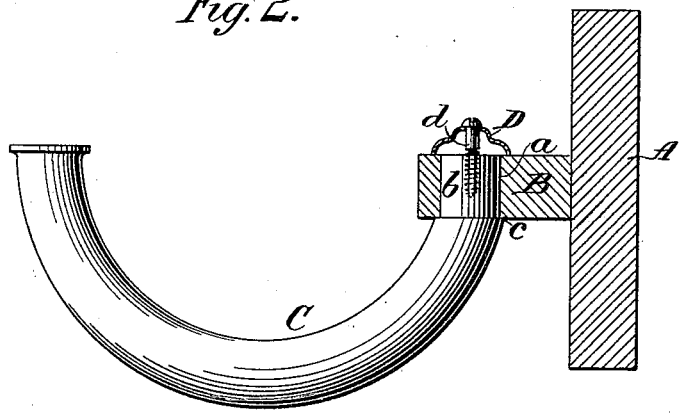

In the accompanying drawings, Figure 1 is an elevation in perspective of a hat and coat hook embodying my improvement. Fig. 2 is a side elevation, partly in section.

Similar letters of reference designate corresponding parts in both of the figures.

A designates a support, here shown as circular, and which may be made of wood. Extending at approximate right angles from the face of the support A is a projection B, which, as illustrated, is semicircular. This projection may be made of wood and secured to the support A by screws or otherwise, as desired. In the projection B are formed upwardly-extending apertures $a$.

C designates hooks, of which I have shown three, but of which there may be one or any desired number. These hooks are semicircular and will preferably be made of wood. Near one of their ends they are provided with shanks $b$, which shanks extend through the apertures $a$ in the projection B. Shoulders $c$ on the hooks abut against the under side of the projection B adjacent to the apertures $a$.

D designates cap-like plates, which, when in position, extend over the upper ends of the apertures $a$ and the shank-like portions $b$ of the hooks. These caps are provided with suitable centrally-arranged apertures, through which are passed screws $d$. These screws are caused to engage the upper portions of the shanks $b$ upon the hook. The shanks $b$ are of such diameter that the hooks C may be turned freely about, the openings in the plates D, through which the screws $d$ pass, being sufficiently large to admit of this without unscrewing the screws.

It will be observed that the hooks are supported at one of their ends only, and that such support is affected wholly by the projection B and the screws $b$.

Although I have shown the projection B as secured to a separate support A, I wish it to be understood that I need not necessarily employ the support A in the form and arrangement shown, but that the projection B may, if desired, be secured directly to a wall or other suitable support. The projection B also need not be of the exact form shown, but the latter may be varied.

It will be seen that by my improvement a very cheap and durable hat and coat hook is constructed, which may be swung around into various positions, and that where a number of such hooks are used they may be arranged as shown upon the projection B in a substantially semicircular manner, which admits of articles being hung upon them very close together and within a limited space.

What I claim as my invention, and desire to secure by Letters Patent, is—

The combination, with a support, of a projection extending at approximate right angles from and secured to said support, said projection being provided with an upwardly-extending aperture, and a hook having one end extending into said aperture and inserted therein so as to turn freely, a plate, and a screw extending through the said plate and engaging the end of the hook which is within the aperture, said hook being wholly supported by said projection, and screw, substantially as specified.

JAMES W. CAMPBELL.

Witnesses:
FREDK. HAYNES,
D. H. HAYWOOD.